United States Patent [19]
Angel

[11] 3,781,675
[45] Dec. 25, 1973

[54] SELF PRIMING CONDUCTIVITY CELL

[75] Inventor: Henry R. Angel, Trumbull, Conn.

[73] Assignee: General Science Corp., Bridgeport, Conn.

[22] Filed: Apr. 27, 1972

[21] Appl. No.: 247,991

[52] U.S. Cl. .......................... 324/71 CP, 324/30 B
[51] Int. Cl. ......................................... G01n 27/00
[58] Field of Search ..................... 324/71 PC, 30 B; 73/421 B; 23/292; 235/92 PC; 323/22 T

[56] References Cited
UNITED STATES PATENTS

| | | | |
|---|---|---|---|
| 3,259,842 | 7/1966 | Coulter et al. | 324/71 CP |
| 3,448,372 | 6/1969 | Legoff | 323/22 T |

*Primary Examiner*—Rudolph V. Rolinec
*Assistant Examiner*—Rolf Hille
*Attorney*—Joseph Weingarten et al.

[57] ABSTRACT

A conductivity cell for use in a system for counting particles suspended in a liquid and operative to reliably and accurately count such particles even in the presence of gas bubbles in the liquid sample. In a counting mode, the cell provides output pulses in response to the passage of particles through a metering aperture, and in a priming mode, the cell is operative to replace a previous liquid sample with a new liquid sample for analysis. During counting operation, gas bubbles which can be present during analysis are collected in a position physically removed from the metering aperture such that these bubbles cannot flow through the aperture during analysis to erroneously affect the particle count. During a priming operation, these bubbles are drawn along with sample fluid from the cell and new sample fluid is infused for a subsequent analytical run. Air is caused to flow through the aperture during a portion of the priming operation in a reverse direction to that of liquid flow during analysis to clear the aperture of any debris which may form during analysis.

18 Claims, 10 Drawing Figures

SELF PRIMING CONDUCTIVITY CELL

FIELD OF THE INVENTION

This invention relates to particle counters and more particularly to a conductivity cell for the reliable and accurate counting of particles suspended in a liquid medium.

BACKGROUND OF THE INVENTION

In particle counters for counting particles suspended in a liquid, a pair of electrodes are disposed within a fluid path with a metering aperture disposed therebetween through which particle-containing liquid is caused to flow. The electrodes are employed to sense the electrical impedance of the fluid path, the impedance being materially altered by the passage of particles through the aperture and which results in corresponding electrical pulses which can be counted for a known volume of liquid to derive a measure of the number of particles within the known volume.

A particularly effective conductivity cell is shown in copending application Ser. No. 38,039 entitled Particle Counting Apparatus, now U.S. Pat. No. 3,665,295 wherein an easily adjustable and interchangeable aperture is provided between an electrode pair, the aperture being sized to accommodate particular particles to be analyzed. The aperture is typically contained within a support member removably disposed within one end of a cell body formed of an electrically insulative material. With the support member installed in the cell body, the aperture is disposed between first and second electrodes which are respectively provided in the input and output fluid passages of the cell. Electrical connection to the cell electrodes is usually accomplished by terminals provided on the cell body, and fluid connection of the cell in an associated particle counting system is typically provided by appropriate fluid couplings. A vent passage is provided in the cell body communicating between the output fluid passage therein and the working atmosphere. During an analytical run, the vent is closed to permit flow of particle-containing liquid through the cell for analysis. After an analytical run, the vent is opened to purge liquid from the cell, which eliminates conduction between the electrodes and which prepares the cell for a subsequent analytical run.

During analysis of a particle-containing liquid, gas bubbles which can form on the electrode surfaces by reason of electrolysis or which may be present in the liquid sample can be drawn through the metering aperture to cause spurious sensing of gas bubbles as true particles and resulting in an erroneous count. The cell described above provides satisfactory performance under most operating conditions; however, it would be advantageous, and it is an object of the present invention, to provide an improved conductivity cell in which bubbles within the cell do not materially affect system performance.

SUMMARY OF THE INVENTION

The present invention provides an improved conductivity cell for the reliable and accurate counting of particles even in the presence of gas bubbles and in which sample liquid is automatically purged and replaced with a new sample for subsequent analysis. The novel cell is operative in a counting mode and in a priming mode. During counting operation, gas bubbles which may form on the electrode surfaces or which may be present in a sample being analyzed are collected in a position within the cell removed from the aperture to prevent their flow through the aperture during analysis. After an analytical run, in which particles in a predetermined volume of liquid are counted, the cell is operated in a priming mode to remove gas bubbles and an analyzed liquid sample from the cell, and to infuse a new liquid sample for subsequent analysis. Cross-contamination of samples is eliminated by virtue of the priming operation since an old liquid sample within the cell is replaced with a new sample prior to a subsequent counting run.

During a portion of the priming operation, air is caused to flow through the aperture in a reverse direction to that of liquid flow during analysis, such air flow serving to backflush the aperture to clear any debris which can accumulate in or near the aperture during analysis. A cell constructed according to the invention is substantially insensitive to bubbles and thus larger electrode surfaces and higher electrode currents can be employed in comparison to previous cell constructions, since bubbles which are present cannot flow through the aperture during analysis to erroneously affect the particle count. Automatic current regulation can be provided for the cell to compensate against the effects of change in aperture size and in the conductivity of the particle-containing liquid.

DESCRIPTION OF THE DRAWINGS

The invention will be more fully understood from the following detailed description taken in conjunction with the accompanying drawings, in which.

DETAILED DESCRIPTION OF THE INVENTION

Figure 1:
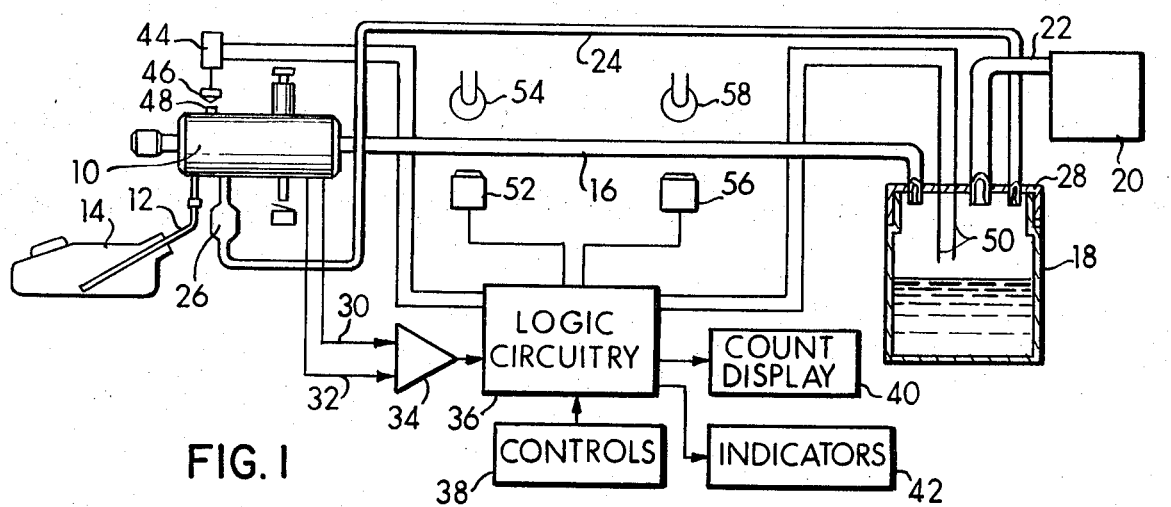
FIG. 1 is a diagrammatic representation of a particle counting system embodying the invention.

A system for counting particles suspended within a liquid and embodying a novel self priming conductivity cell according to the invention is depicted in FIG. 1. Such a particle counting system is itself the subject of application Ser. No. 32,582, filed Apr. 28, 1970, now U.S. Pat. No. 3,657,725, and will be described herein to an extent sufficient for an understanding of the present invention. The conductivity cell 10 provides a fluid measuring path for producing electrical pulses in response to the passage of particles through an aperture sized to accommodate particular particles being counted, the electrical pulses being accumulated for a given volume of liquid to provide an output indication of particle count. The conductivity cell 10 includes a fluid input passage 12 which communicates with a sample bottle 14 having a particle-containing liquid therein which is to be analyzed. A tube 16 is coupled between the fluid output passage of cell 10 and a waste bottle 18. A vacuum pump 20 is coupled via a tube 22 to waste bottle 18 for providing a vacuum for drawing sample fluid from bottle 14 through cell 10 and tube 16 into the waste bottle. A tube 24 is coupled between a priming output of cell 10 and waste bottle 18 and includes a liquid accumulator 26. A cover 28 for bottle 18 is provided and is in sealing engagement with tubes 16, 22 and 24 such that a negative pressure can be maintained within bottle 18 by means of pump 22.

The electrical output leads 30 and 32 of the fluid measuring path within cell 10 are coupled via an amplifier 34 to logic circuitry 36 which includes associated controls 38. The logic circuitry is operative to energize a count display 40 and system indicators 42. Logic circuitry 36 is also operative to control a solenoid 44 coupled to a stopper 46 for selectively closing and opening a vent port 48 of cell 10. A pair of electrodes 50 disposed within waste bottle 18 are coupled to logic circuitry 36, these electrodes being employed to sense liquid within bottle 18 at a predetermined level to provide an overflow indication to the logic circuitry and to prevent spillage of fluid from bottle 18.

Volume measuring means is provided to define a predetermined volume of liquid for which a particle count is taken, and in the illustrated embodiment such volume measurement is accomplished by a first photosensor 52 disposed adjacent tube 16 which is light transmissive in a position to receive light transmitted through tube 16 from an associated light source 54. A second photosensor 56 is provided downstream from sensor 52 and also in position to receive light transmitted through tube 16 from an associated light source 58. The photosensors 52 and 56 are each coupled to logic circuitry 36 and are operative, respectively, to start and stop the counting operation upon passage of liquid within tube 16 past the respective photosensor positions. It will be appreciated that other measuring techniques can also be employed to define the intended fluid volume. For example, passage of liquid can be sensed by other than the photosensor technique shown, such as by electrodes in the path of flow. Volume can also be determined without liquid sensing by providing a time interval within which a known volume of liquid is caused to flow and within which a count is accomplished.

Figure 2:
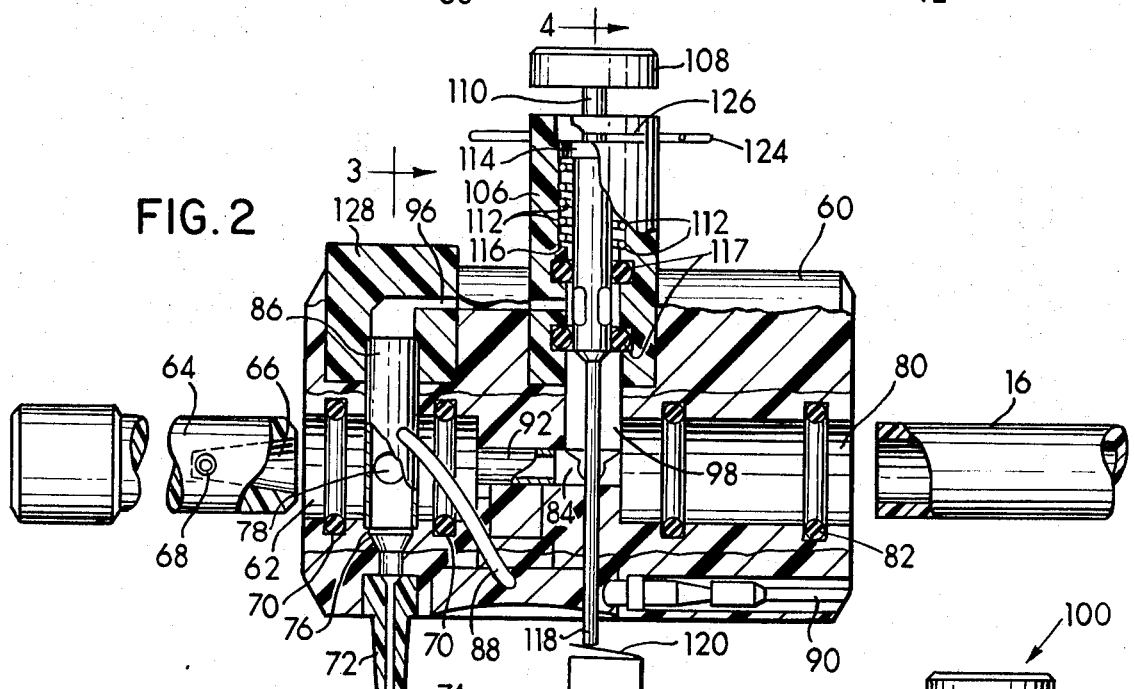
FIG. 2 is an elevation view, partly in section of a conductivity cell according to the invention.
Figure 3:
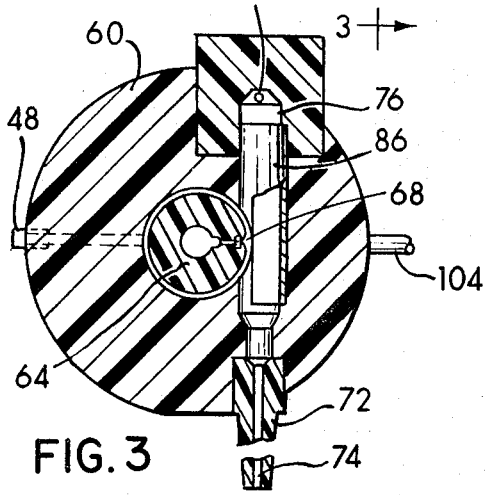
FIG. 3 is a sectional view of the conductivity cell taken along lines 3 — 3 of FIG. 2.
Figure 4:
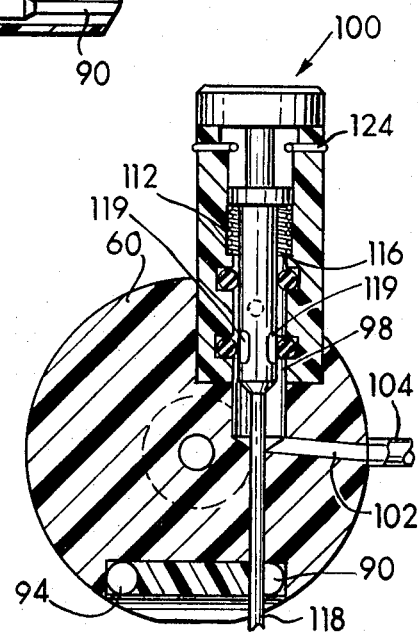
FIG. 4 is a sectional view of the conductivity cell taken along lines 4 — 4 of FIG. 2.

A conductivity cell according to the invention is illustrated in FIGS. 2 – 4 and includes a body 60 generally cylindrical in shape and typically formed of a clear plastic material such as plexiglass which is easily cleaned and compatible with the liquids being analyzed. An opening 62 is provided in one end of body 60 to accommodate a cylindrical support member 64 having an aperture through which fluid is caused to flow for analysis. Support member 64 includes an opening 66 coaxially formed in an end thereof and communicating with an aperture plate 68 disposed within the wall of member 64. The aperture plate 68 is typically a ruby in which is formed an opening sized to permit passage of particular particles to be counted. A sealing element such as O-rings 70 are provided within grooves formed around opening 62 to maintain support member 64 in sealed engagement therein. An input coupling 72 extends from body 60 as illustrated and includes an input passage 74 which communicates with an enlarged vertical passage 76 having an opening 78 in alignment with aperture 68 when support member 64 is inserted within associated opening 62.

Figure 5:
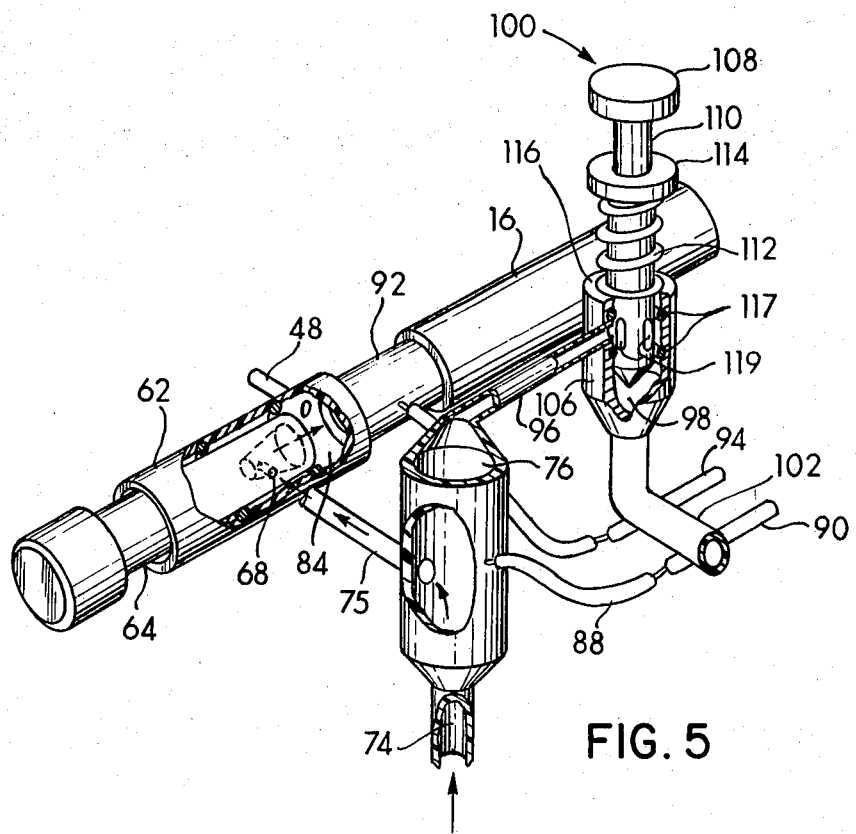
FIG. 5 is a diagrammatic representation of the fluid passages of the conductivity cell illustrating fluid flow therethrough with the priming button in a raised position.

An opening 80 is provided at the opposite end of body 60 to accommodate tube 16, with O-rings 82 being provided within grooves around opening 80 to seal tube 16 therein. A passage 84 provides a fluid path between opening 62 and opening 80. The fluid path for analysis is from a source of particle-containing fluid, such as sample bottle 14 (FIG. 1), through passages 74, 76, aperture 68 and thence through passage 84 into tube 16. A first electrode 86 of generally semicylindrical form is provided within passage 76 and is connected via a wire 88 to a terminal 90 disposed within the lower portion of body 60. A second electrode 92 of cylindrical configuration is provided within passage 84 and is connected via an interconnecting wire (not visible) to a terminal 94 which is seen in FIGS. 4 and 5. The fluid measuring path is provided by aperture 68 disposed between the pair of electrodes 86 and 92 which are operative to measure the impedance of the liquid between the electrodes and to provide an output indication of impedance change caused by the passage of particles through the associated aperture. An energizing potential is applied to the electrode pair and the passage of particles through the aperture is manifest by a change in potential across the electrodes which causes output pulses sensible by the amplifier 34 and which are then processed by the logic circuitry to provide an output indication of particle count.

The passage 76 extends upward beyond the position of aperture 68 and at its upper extremity terminates in a passage 96 which is communicative with a cylindrical chamber 98 in which a plunger 100 is slidably disposed. The chamber 98 is coupled at its lower end to a passage 102 which terminates at a fluid coupling 104. The plunger 100 is disposed at its upper portion within an upstanding housing 106. A manually operable button 108 is connected via a stem 110 to the upper end of plunger 100 to permit depression thereof within the associated chamber 98. A spring 112 is disposed between a flange 114 provided near the upper end of plunger 100 and a shoulder portion 116 provided in chamber 98 to urge plunger 100 into a raised position, as illustrated in FIG. 2, in the absence of manual force applied to button 108. A pair of O-rings 117 are provided around chamber 98 to sealingsly engage plunger 100 within chamber 98.

A plurality of elongated channels 119 are provided in plunger 100 extending axially thereof and being in alignment with passage 96 and in a position between respective O-rings 117 with plunger 100 in its raised position, as depicted in FIG. 2. In this raised position, fluid within passage 96 cannot be drawn into chamber 98 since a fluid seal is provided by plunger 100 cooperating with O-rings 117 in its raised position. When, however, the plunger is depressed, as shown in FIG. 4, causing the channels 119 to straddle the lower O-ring 117 and extend slightly above and below the upper and lower surfaces of the O-ring, fluid can flow from passage 96 through channels 119 and into chamber 98 and thence via passage 102 to the output coupling 104.

The plunger 100 extends vertically through body 60 and with button 108 depressed, as in FIG. 4, the lower extremity 118 of plunger 100 extends beyond the outer surface of body 60 by an extent sufficient to engage an actuating arm 120 associated with a switch 122 which is operative during system operation in a manner to be described. The plunger 100 is maintained within the cell body by a retaining clip 123 cooperative with a groove 126 provided in housing 106. The surface 128 which confronts the upper extremity of passage 76 can be polished to provide a window for viewing this upper extremity of the passage 76 in which bubbles tend to form due to electrolysis present during an analytical run. This upper surface 128 can also be formed of convex configuration to provide a magnifying lens to enlarge the view of the upper chamber in which bubbles collect, for ease of visual inspection.

The flow paths within the conductivity cell with the plunger in its raised position can best be seen in the diagrammatic representation of the fluid passages shown in FIG. 5. The components of FIG. 5 are as numbered in the embodiment described hereinabove. For purposes of clarity, the fluid input passage 74 is shown physically spaced from aperture 68 and coupled thereto by a passage 75; in actual embodiment, as shown in FIGS. 2 – 4, the input passage is immediately adjacent the aperture. Also for clarity, the lower end of the plunger stem 110 is shown cutoff. Referring to FIG. 5, with vent port 48 open, the vacuum in tube 16 provided by the pump 20 (FIG. 1) causes air to be drawn from the atmosphere into vent 48 and thence through passage 84 and tube 16 into the waste bottle 18 (FIG. 1). When vent 48 is closed, particle-containing liquid is drawn into passage 74, and thence via passages 76 and 75, through aperture 68 and into passage 84. Thereafter, the liquid is drawn through tube 16 for actuation of the start and stop sensors after which the fluid is drawn into the waste bottle. Bubbles which tend to form during an analytical run such as by electrolysis, or which are present in a liquid sample, rise to the top of chamber 76 away from the path of liquid flow and do not therefore interfere with the accuracy of the cell counting operation as no bubbles are drawn through the aperture 68. The fluid path for purging liquid is closed when the plunger 100 is in its raised position. As illustrated in FIG. 5, the channels 119 formed in plunger 100 are between the upper and lower O-rings 117, and the lower O-ring and confronting circumferential portion of plunger 100 thus seals the fluid path between passage 96 and passage 102.

Figure 6:
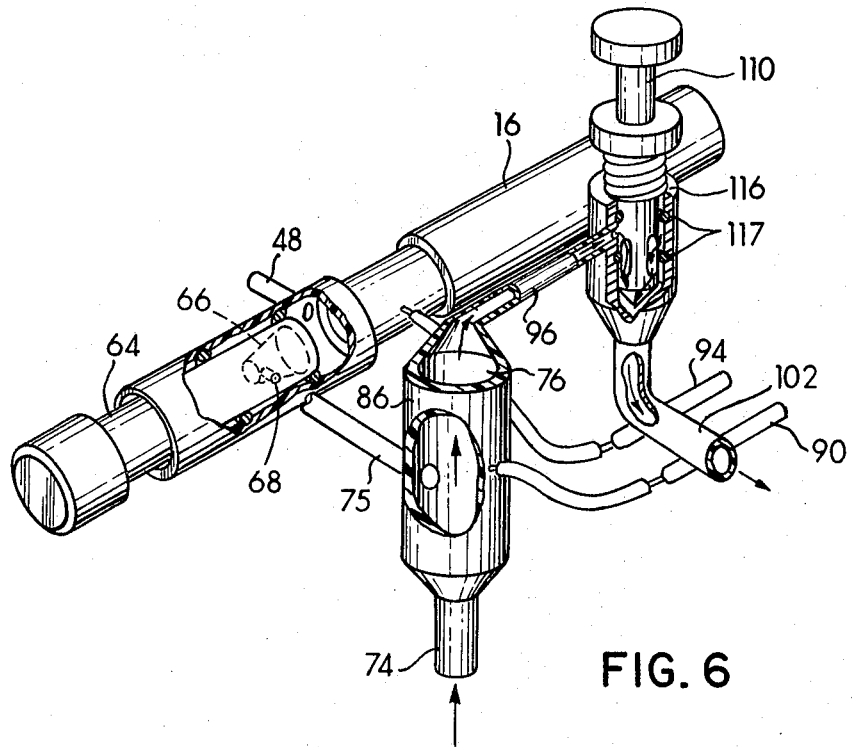
FIG. 6 is a diagrammatic representation of the fluid passages of the conductivity cell illustrating fluid flow therethrough with the priming button in a depressed position.

With the plunger in its depressed position, as depicted in FIG. 6, the channels 119 are in a position straddling the lower O-ring 117 to provide a path between passages 96 and 102 to cause purging of particle-containing liquid after an analytical run and priming of the cell for a succeeding run. During the initial period of a priming operation, vent 48 is closed and a vacuum on passage 102 provided by the system pump causes liquid in passages 74 and 76 to be drawn via passage 96 through channels 116 into passages 98 and 102, and thence to the waste bottle. Any residual liquid between the aperture 68 and the input passage is also drawn out through the purging path. Air bubbles collected in the upper portion of passage 96 are also withdrawn along with the liquid. The hydraulic impedance of the purging path is lower than that of the cell counting path, and thus, during purging, liquid flow tends to bypass aperture 68 and to flow into passage 96 for removal from the cell.

After purging of the liquid from the cell, vent 48 is opened and, with plunger 100 remaining depressed, air is drawn into the vent passage and through aperture 68 in a direction opposite to that of liquid flow during a counting run, and thence via passages 76, 96, channels 116 and passage 102 into the waste bottle. Air and bubbles within flow tube 16 are also drawn into the waste bottle during this operating state. The reverse flow of air through aperture 68 causes backflushing of debris which can accumulate in the aperture, and, thus, the invention provides not only purging of the cell for a subsequent analytical run but also automatic cleaning of the aperture between runs.

Figure 7:
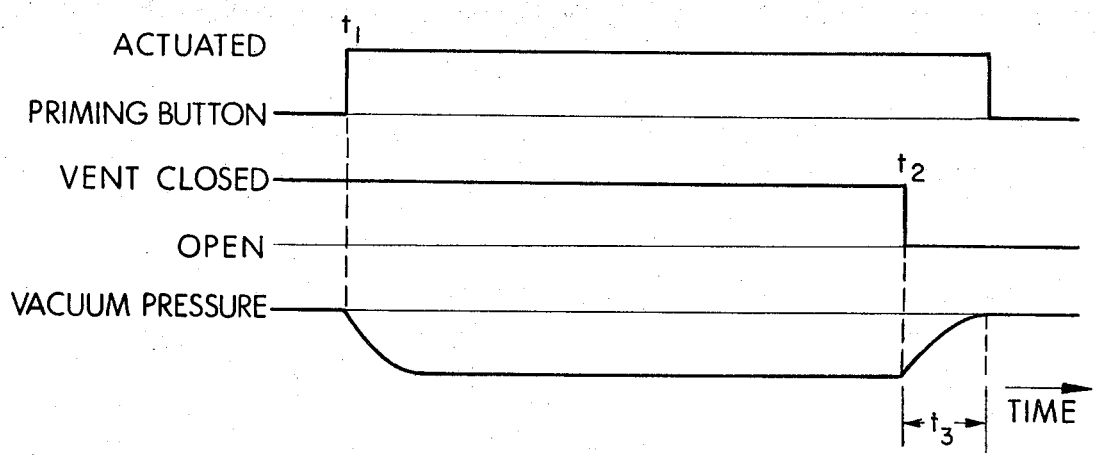
FIG. 7 is a timing diagram useful in illustrating operation of the self priming cell.

A typical operating sequence of the novel self priming cell is depicted in the timing diagram of FIG. 7. After completion of a particle count on a liquid sample drawn through the cell at a time, $t_1$, the priming button is actuated by manual depression of plunger 100, the vent port remaining closed. The vacuum pressure in passage 76 builds up to an amount determined by the pump employed and remains at this pressure level until a time, $t_2$, at which the vent is opened to the atmosphere. As air enters vent 48, aperture 68 and passages 76, 96 and 102 of the priming path, the vacuum decreases during a time interval, $t_3$, toward atmospheric level. The time interval $t_3$ is the interval in which air is caused to flow in a direction reverse to normal liquid flow through aperture 68 for backflushing the metering aperture. After this interval of time, the priming button is released to place the conductivity cell in condition for the next analytical run.

In the illustrated embodiment, the priming button is shown as being manually actuable. It will be appreciated, however, that the priming button can be automatically actuated such as by a solenoid control similar to that employed to operate the vent port. Appropriate control circuitry can be provided to actuate the vent and priming control in timed relation suitable for intended system operation, as described hereinabove.

Figure 8:
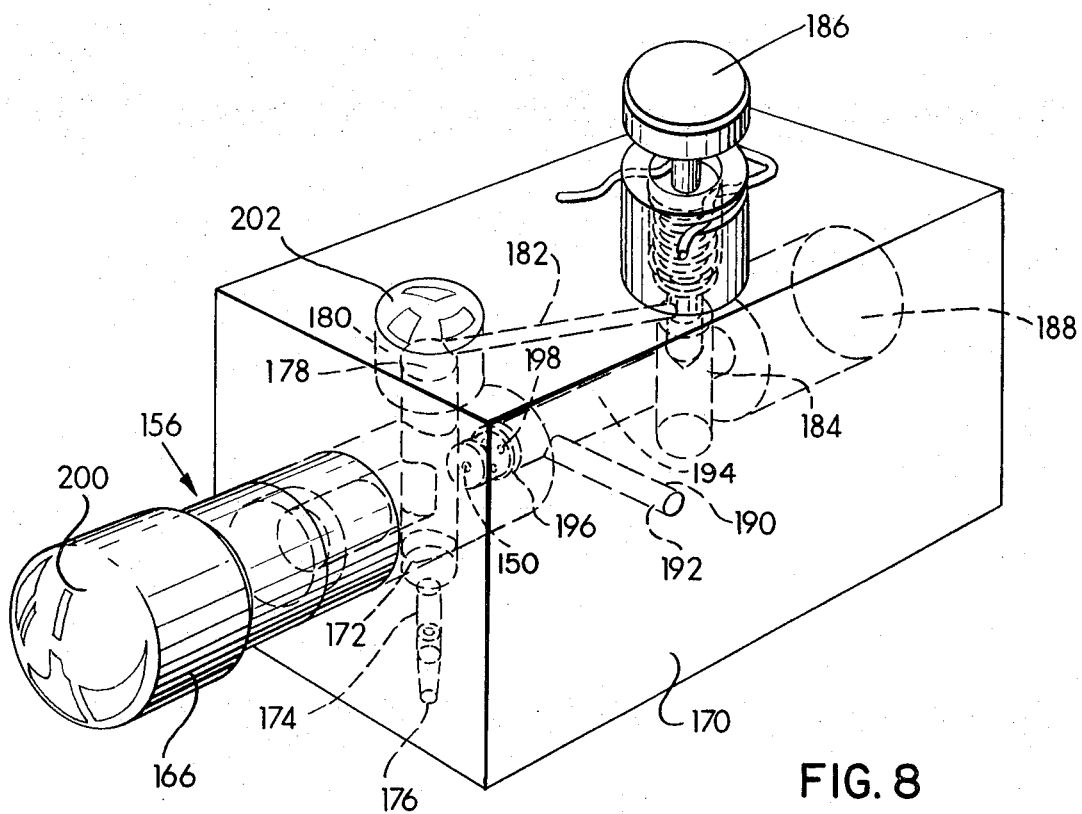
FIG. 8 is a pictorial view of an alternative embodiment of a conductivity cell according to the invention.
Figure 9:
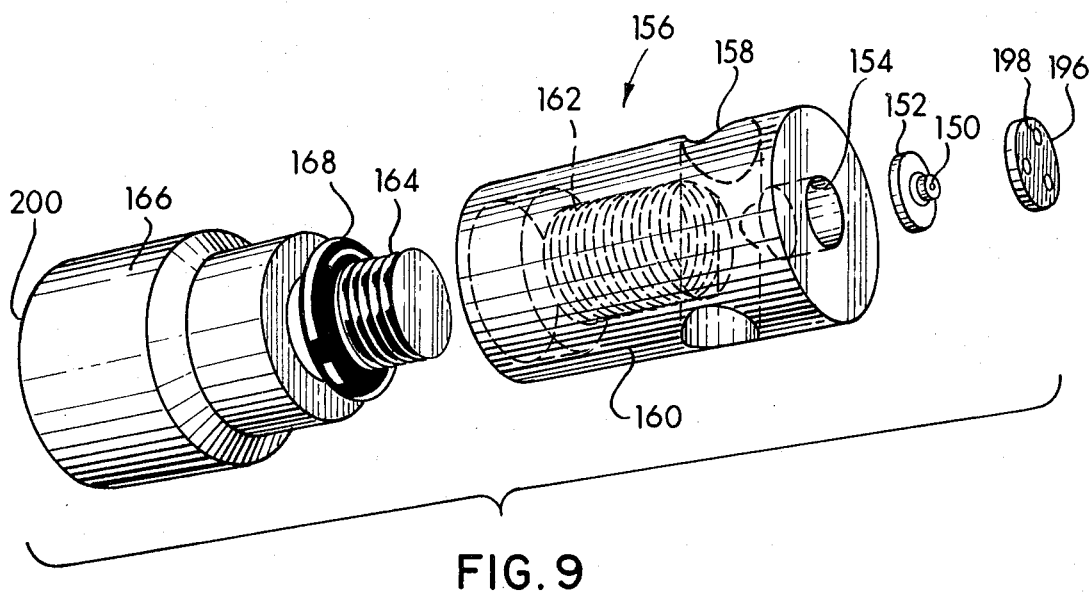
FIG. 9 is an exploded pictorial view of the aperture support member of the embodiment of FIG. 7.

An alternative embodiment of the invention is shown in FIGS. 8 and 9 in which the aperture can be visually inspected during operation of the cell and which is useful to determine whether an aperture blockage occurs. Referring to FIG. 9, an aperture 150 formed in a disc 152 is coaxially disposed within an opening 154 provided in support member 156. The opposite side of aperture 150 communicates with an opening 158 provided through the support member in a direction transverse to opening 154. The support member 156 is, in the illustrated embodiment, formed in two connectable sections, section 160 containing the aperture 150 and its associated fluid passages and a threaded opening 162 adapted to be threadably engaged by a threaded stud portion 164 provided on the end of section 166 which serves as a handle for the support member. An O-ring 168 is provided at the inner end of threaded portion 164 to sealingly engage the confronting ends of section 160 when the two sections are threaded together. The threaded opening 162 communicates at its inner end with transverse opening 158, and with section 160 removed from handle section 166, both sides of aperture 150 are accessible for cleaning and inspection.

The support member is installed in a cell body 170, as shown in FIG. 8, within an opening 172. An input passage 174 is coupled to passage 172 in a position to communicate with passage 158 when the support member is inserted within the cell body, and which terminates in a coupling 176 which can be connected to a source of sample liquid for analysis. A passage 178 also communicates with the upper end of passage 158 and terminates in a bubble chamber 180 in which bubbles collect during a counting run. The bubble chamber is connected via a passage 182 to a passage 184 in which the priming control valve is contained. The priming path operates identically to that shown in the above embodiment to permit, upon depression of priming button 186, drawing of fluid through passages 182 and 184 into output fitting 188 and thence to the waste bottle. A vent passage 190 is also coupled between a vent port 192 and passage 172 and is operative as described above. Electrodes are provided on respective opposite sides of apperture 150, one electrode typically being provided within passage 194, the other electrode being provided within passage 176.

A baffle plate 196 is disposed within an end of passage 194 confronting aperture 150 and in the illustrated embodiment includes a small disc having openings 198 circumferentially spaced therearound in a position radially removed from the axial position of the aperture. Since in the embodiment of FIGS. 8 and 9 the aperture is disposed coaxially within the cell, the aperture can serve as a nozzle to cause spraying of liquid being drawn through the cell for analysis. To provide more uniform flow, the baffle 196 serves to minimize the effects of spraying and turbulence which can be caused by liquid emanating from the aperture.

The support member 156 is typically formed of a transparent material such as plexiglass and the end thereof outside of the cell is polished to serve as a window for viewing aperture 150. This end surface 200 can be of convex configuration as shown to serve as a magnifying lens to enlarge the aperture being viewed. The surface 202 of the cell body confronting the bubble chamber 180 can also be of convex configuration to serve as a manifying lens to observe bubble collection. Fluid connection is made to the cell from the rear surface thereof and electrical connection can also be made at this surface by means of rearwardly extending terminals as in FIG. 2. Thus, the cell construction of FIG. 8 is readily installed into an associated system by means of plug connections at the rear surface thereof.

Figure 10:
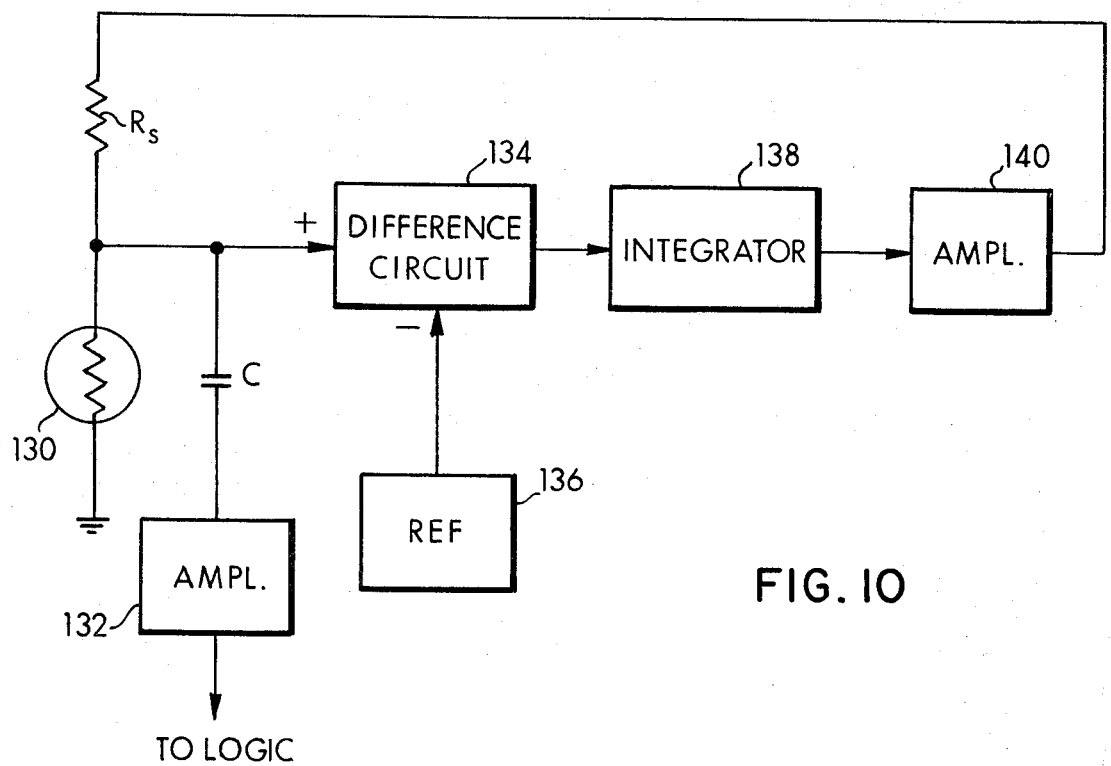
FIG. 10 is a diagrammatic representation of a current regulating circuit according to the invention.

Since the conductivity cell senses changes in impedance caused by the passage of particles through the aperture within the conductive fluid path, variations in the conductivity of the particle-containing liquid and variations in aperture area through which particles are caused to flow can cause variations in the amplitude of signals resulting from passage of particles through the aperture. Such changes in signal magnitude can cause inaccurate particle counts by reason of the varying amplitude signals which are compared with a reference threshold for counting. A technique for the automatic regulation of cell current to compensate for variations in diluent conductivity and aperture area is depicted in FIG. 10. The fluid measuring path of the conductivity cell is depicted as a resistor 130 having one terminal connected to ground or other suitable reference potential, and the other terminal connected via a capacitor C to an amplifier 132 the output of which is operative to drive the circuitry of the particle counting system such as the logic circuitry 36 of FIG. 1. The conductivity cell is also connected as shown to one input of a difference circuit 134, the other input of which is provided by a current reference source 136. The output of difference circuit 134 is applied to an integrator 138, the output of which is applied to an amplifier 140. The output of amplifier 140 is connected by means of a series resistor $R_s$ to the terminal of cell 130 connected to circuit 134.

The impedance of the measuring path of cell 130 is a result of the conductivity of the diluent between the electrodes therein, and this impedance can vary in accordance with changes in the area of the aperture employed, such as caused by partial blockage of the aperture by debris, and also with the conductivity of the particular diluent. The illustrated circuit operates such that a change in voltage drop across the cell impedance creates an error signal that is integrated to cause a compensating slow change in aperture current to return the voltage drop to a reference level. The output signal of the cell is therefore regulated to provide constant amplitude output signals in response to the passage of particles through the aperture even in the presence of changes in conductivity of the diluent flowing through the aperture or of variations in aperture area.

In operation, the reference source 136 is adjusted to provide a predetermined reference current which is intended to flow through the conductive path of cell 130 for a predetermined diluent conductivity and aperture size. Variations in the intended current, caused by aperture blockage or changes in diluent conductivity, cause a signal to be applied to difference circuit 134 which is different in magnitude from the reference signal thereby causing the generation of an error signal. The error signal is processed by integrator 138 and amplifier 140 to provide a correction signal to the cell via resistor $R_s$ such that the cell current is driven to a magnitude which tends to reduce the error signal from difference circuit 134 to zero. Impedance variations in the measuring path are therefore compensated by the regulation loop. The regulation circuit is not limited to use with the self priming cell described herein but is generally useful with conductivity cells employed in particle counting systems, such as the cell described in the above-identified copending application.

Various modifications and alternative implementations will now occur to those versed in the art without departing from the true spirit and scope of the present invention. Accordingly, it is not intended to limit the invention by what has been particularly shown and described except as indicated in the claims.

What is claimed is:

1. For use in a system for counting particles suspended within a liquid, a conductivity cell comprising:
   a cell body having an input passage therein adapted to be coupled to a supply of liquid to be analyzed, and an output passage therein adapted to be coupled to a tube through which said liquid flows during an analytical run;
   a support member having an aperture provided therein, said support member being removably disposed within said cell body with said aperture having one end in alignment with the input passage of said cell body and an opposite end in alignment with the output passage of said cell body;

first and second electrodes respectively disposed in said input passage and said output passage and confronting respective ends of said aperture;

means for providing electrical connection from said first and second electrodes to respective terminals on said cell body;

a vent passage within said cell body communicating with said output passage at a position near said aperture;

a bubble chamber communicating with said input passage and operative to collect gas bubbles present in said liquid in a position removed from said aperture such that said gas bubbles are not drawn through said aperture during analysis; and priming means including a valve mechanism, a first passage communicating between said valve mechanism and said bubble chamber, and a second passage communicating between said valve mechanism and a priming output port, said priming means being operative with said valve mechanism in a first position to prevent fluid flow through said first and second passages to said priming output port, and operative with said valve mechanism in a second position to allow fluid flow through said first and second passages to said priming output port.

2. The invention according to claim 1 wherein said valve mechanism includes means operative to actuate an electrical switch associated with said cell.

3. The invention according to claim 1 wherein said valve mechanism includes:

an elongated opening in said cell body;

a plunger slidably disposed in said elongated opening;

means for sealing said plunger within said opening; and at least one channel provided in said plunger and positioned and constructed to permit said plunger in said second position to permit fluid communication between said first and second passages.

4. The invention according to claim 3 wherein said valve mechanism includes spring means for urging said plunger into said first position in the absence of an actuating force applied thereto.

5. The invention according to claim 1 wherein said aperture is disposed coaxially in said support member and said support member includes a passage therein communicating between said one end of said aperture and said input passage.

6. The invention according to claim 5 further including a baffle plate disposed in said cell body within said output passage in a position confronting said opposite end of said aperture, said baffle plate having openings therethrough and operative to minimize the effects of spraying and turbulence of liquid emanating from said aperture.

7. The invention according to claim 1 wherein said aperture is disposed within a wall of said support member with said one end in confronting relation with said input passage.

8. The invention according to claim 1 wherein said cell body includes a transparent window in a surface thereof confronting said bubble chamber and operative to permit viewing of said chamber.

9. The invention according to claim 8 wherein said transparent window is a lens for magnified viewing of said bubble chamber.

10. The invention according to claim 1 wherein said support member is of transparent material and said aperture is disposed coaxially therein, the end of said support member external to said cell body having a window provided in the surface thereof for viewing of said aperture along the axis of said support member.

11. The invention according to claim 10 wherein said window is a magnifying lens to provide magnified viewing of said aperture.

12. The invention according to claim 1 wherein said support member is of transparent material and said aperture is disposed coaxially therein, with a transverse passage communicating with said one end of said aperture and said input passage, the end of said support member external to said cell body having a window therein for viewing of said aperture along the axis of said support member.

13. The invention according to claim 12 wherein said support member includes a section external to said cell body detachably connected to a section including said aperture, said aperture-containing section having a coaxial opening therein communicating between said one end of said aperture and the end of said section confronting said external section to permit cleaning of said aperture with said aperture-containing section detached.

14. The invention according to claim 1 wherein said priming means is operative with said valve mechanism in said second position to permit air flow from said vent passage, aperture, and bubble chamber through said first and second passages to said priming output port for backflushing of said aperture.

15. For use in a system for counting particles suspended within a liquid, a conductivity cell comprising:

a cell body having an input passage therein adapted to be coupled to a supply of liquid to be analyzed, and an output passage therein adapted to be coupled to a tube through which said liquid flows during an analytical run;

first and second electrodes respectively disposed in said input passage and said output passage and operative to provide an electrical current therebetween with liquid in said passages;

means for providing electrical connection from said first and second electrodes to respective terminals;

a support member removably disposed within said cell body and having an aperture in said support member disposed with one end in alignment with said input passage and an opposite end in alignment with said output passage;

a vent passage within said cell body communicating between the atmosphere and said output passage at a position near said aperture;

a bubble chamber within said cell body communicating with said input passage and operative to collect gas bubbles present in said liquid in a position removed from said aperture such that said gas bubbles are not drawn through said aperture during analysis; and priming means including a valve mechanism, a first passage communicating between said valve mechanism and said bubble chamber, and a second passage communicating between said valve mechanism and a priming path which is of lower hydraulic impedance than the path provided by said input and output passages of said cell body;

said cell being operative with said vent passage closed and said valve mechanism in a first position to allow fluid flow through said input and output passages and said aperture, and operative with said vent passage closed and said valve mechanism in a second position to allow fluid flow through said first and second passages to said priming output port, and operative with said valve mechanism in said second position and said vent passage open to allow the passage of air into said vent passage, through said aperture and thence through said first and second passages to said priming output port.

16. The invention according to claim 15 further including means for regulating electrical current applied to said electrodes to compensate for variations in liquid conductivity and aperture area, said means comprising:

a difference circuit having one input coupled to said electrodes and operative to sense a change in current flow between said electrodes and to provide an error signal representative of said change;

a reference source for providing a reference current to a second input of said difference circuit, said reference current being of a magnitude equal to an intended current between said electrodes for a predetermined liquid conductivity and aperture area;

an integrator coupled to said difference circuit and operative to provide a correction signal in response to an error signal provided by said difference circuit; and resistor means for coupling said correction signal to said electrodes to adjust the electrode current to a magnitude at least substantially equal to said reference current.

17. For use in a system for counting particles suspended within a liquid, the combination comprising:

a conductivity cell including a liquid path having an aperture therein through which particle-containing liquid is caused to flow and a pair of electrodes on respective opposite sides of said aperture operative to sense the electrical impedance of the liquid path and to provide electrical pulses in response to the passage of particles through the aperture;

means for regulating the electrical current applied to said electrodes to compensate for variations in liquid conductivity and aperture area, said means including:

a difference circuit having one input coupled to said electrodes and operative to sense a change in voltage drop across said electrodes and to provide an error signal representative of said change;

a reference source for providing a reference current to a second input of said difference circuit, said reference current being of a magnitude equal to an intended current between said electrodes for a predetermined liquid conductivity and aperture area;

an integrator coupled to said difference circuit and operative to provide a correction signal in response to an error signal provided by said difference circuit; and resistor means for coupling said correction signal to said electrodes to adjust the electrode current to a magnitude which tends to reduce the error signal to zero.

18. For use in a system for counting particles suspended within a liquid, a conductivity cell comprising:

a cell body having an input passage therein adapted to be coupled to a supply of liquid to be analyzed, and an output passage therein adapted to be coupled to a tube through which said liquid flows during an analytical run;

a support member having an aperture provided therein, said aperture having one end in alignment with the input passage of said cell body and an opposite end in alignment with the output passage of said cell body;

first and second electrodes respectively disposed in said input passage and said output passage and confronting respective ends of said aperture;

means for providing electrical connection from said first and second electrodes to respective terminals on said cell body;

a vent passage within said cell body communicating with said output passage at a position near said aperture;

a bubble chamber communicating with said input passage and operative to collect gas bubbles present in said liquid in a position removed from said aperture such that said gas bubbles are not drawn through said aperture during analysis; and priming means including a valve mechanism, a first passage communicating between said valve mechanism and said bubble chamber, and a second passage communicating between said valve mechanism and a priming output port, said priming means being operative with said valve mechanism in a first position to prevent fluid flow through said first and second passages to said priming output port, and operative with said valve mechanism in a second position to allow fluid flow through said first and second passages to said priming output port.

* * * * *